US005398997A

United States Patent [19]
McFalls

[11] Patent Number: 5,398,997
[45] Date of Patent: Mar. 21, 1995

[54] SEAT BELT SYSTEM WITH BUCKLE-RESPONSIVE RETRACTOR LOCK

[75] Inventor: Bob L. McFalls, Shelby Township, Macomb County, Mich.

[73] Assignee: TRW Vehicle Safety Systems Inc., Lyndhurst, Ohio

[21] Appl. No.: 117,604

[22] Filed: Sep. 7, 1993

[51] Int. Cl.$^6$ ............................................. B60R 22/34
[52] U.S. Cl. ..................................... 297/476; 297/484; 242/382; 280/807
[58] Field of Search .............................. 297/474–476, 297/468, 464, 484, 234, 238, 250.1; 280/807; 242/382, 384.7

[56] References Cited

U.S. PATENT DOCUMENTS

| | | |
|---|---|---|
| 3,278,231 | 10/1966 | Hirsch et al. |
| 3,294,447 | 12/1966 | Riley . |
| 3,323,831 | 6/1967 | Buechler . |
| 3,890,003 | 6/1975 | Close . |
| 3,915,401 | 10/1975 | Takada . |
| 4,065,072 | 12/1977 | Magyar .......................... 297/476 X |
| 4,720,148 | 1/1988 | Anthony et al. . |
| 4,732,409 | 3/1988 | Colasanti . |
| 5,031,962 | 7/1991 | Lee ..................................... 297/484 |
| 5,161,855 | 11/1992 | Harmon ............................. 297/238 |

Primary Examiner—Kenneth J. Dorner
Assistant Examiner—Milton Nelson, Jr.
Attorney, Agent, or Firm—Tarolli, Sundheim & Covell

[57] ABSTRACT

A seat belt system (10) for restraining a vehicle occupant includes a retractor (18), a first locking tongue (40), a second locking tongue (46) and a buckle (20). The retractor (18) includes a spool (60) which is rotatable in a webbing winding direction and a webbing unwinding direction. The retractor (18) further includes a lock bar (70) which blocks rotation of the spool (60) in the webbing unwinding direction when the lock bar (70) is in a locking position. The first locking tongue (40) is connected with one length (26) of seat belt webbing (16). The second locking tongue (46) is connected with another length (28) of seat belt webbing (16). The buckle (20) has a locking mechanism (82, 90) for locking the first and second tongues (40) and (46) in a buckle (20). The seat belt system (10) further includes an actuator (130) for moving the lock bar (70) in the retractor (20) into the locking position in response to locking of the first and second tongues (40) and (46) in the buckle (20). The actuator (130) moves the lock bar (70) into the locking position only in response to locking of both the first and second tongues (40) and (46) in the buckle.

12 Claims, 7 Drawing Sheets

SEAT BELT SYSTEM WITH BUCKLE-RESPONSIVE RETRACTOR LOCK

FIELD OF THE INVENTION

The present invention relates to a seat belt system for restraining an occupant of a vehicle, and particularly relates to a seat belt system including seat belt webbing, a buckle for releasably locking the webbing about a vehicle occupant, and a retractor in which the webbing is wound on a spool.

BACKGROUND OF THE INVENTION

A seat belt system for restraining an occupant of a vehicle ordinarily includes seat belt webbing, a buckle and a retractor. A locking tongue is connected to the webbing and is releasably lockable in the buckle when the webbing is extended around the vehicle occupant. The retractor includes a spool upon which the webbing is wound. The spool in the retractor rotates in an unwinding direction when the vehicle occupant withdraws the webbing from the retractor and moves the webbing toward the extended position in which the tongue is locked in the buckle. When the tongue is subsequently unlocked and released from the buckle, a spring in the retractor rotates the spool in a winding direction to draw the webbing back into the retractor, and thus to move the webbing back from the extended position to a retracted position.

When the vehicle experiences a collision, the vehicle occupant wearing the seat belt webbing moves forcefully against the webbing. The force which is then applied to the webbing by the vehicle occupant urges the webbing to move outward from the retractor. Therefore, a retractor in a seat belt system ordinarily includes a lock-up mechanism which prevents the spool from rotating in the unwinding direction when the vehicle experiences a collision. Several different types of lockup mechanisms are known. One type of lock-up mechanism is associated with the buckle. That type of lock-up mechanism is actuated by the tongue on the webbing upon locking of the tongue in the buckle. For example, one such lock-up mechanism is disclosed in U.S. Pat. No. 4,720,148.

SUMMARY OF THE INVENTION

In accordance with the present invention, a seat belt system for restraining an occupant of a vehicle comprises a retractor, first and second locking tongues, and a buckle. The retractor includes a spool which is rotatable in a webbing winding direction and a webbing unwinding direction. The retractor further includes a blocking means for blocking rotation of the spool in the webbing unwinding direction when the blocking means is actuated. The first tongue is connectable with one length of seat belt webbing. The second tongue is connectable with another length of seat belt webbing. The buckle has a locking means for locking the first and second tongues in the buckle.

The seat belt system further includes an actuator means for actuating the blocking means in the retractor in response to locking of the first and second tongues in the buckle. The actuator means actuates the blocking means only in response to locking of both the first and second tongues in the buckle.

A seat belt system constructed in accordance with the present invention prevents the webbing from being withdrawn from the retractor by the force of a vehicle occupant moving against the webbing during a vehicle collision. Such withdrawal of the webbing from the retractor during a vehicle collision is prevented because the blocking means for blocking rotation of the spool in the webbing unwinding direction is actuated in response to locking of the first and second tongues in the buckle. Additionally, the seat belt system constructed in accordance with the present invention enables the vehicle occupant to make adjustments to the position of the webbing by moving the webbing into or out of the retractor after the first tongue is locked in the buckle. The vehicle occupant can make such adjustments because the blocking means in the retractor is not actuated until both the first and second tongues are locked in the buckle.

BRIEF DESCRIPTION OF THE DRAWINGS

The foregoing and other features of the present invention will become apparent to those skilled in the art to which the present invention relates from reading the following description with reference to the accompanying drawings, in which.

DESCRIPTION OF PREFERRED EMBODIMENTS

Figures 1, 2:
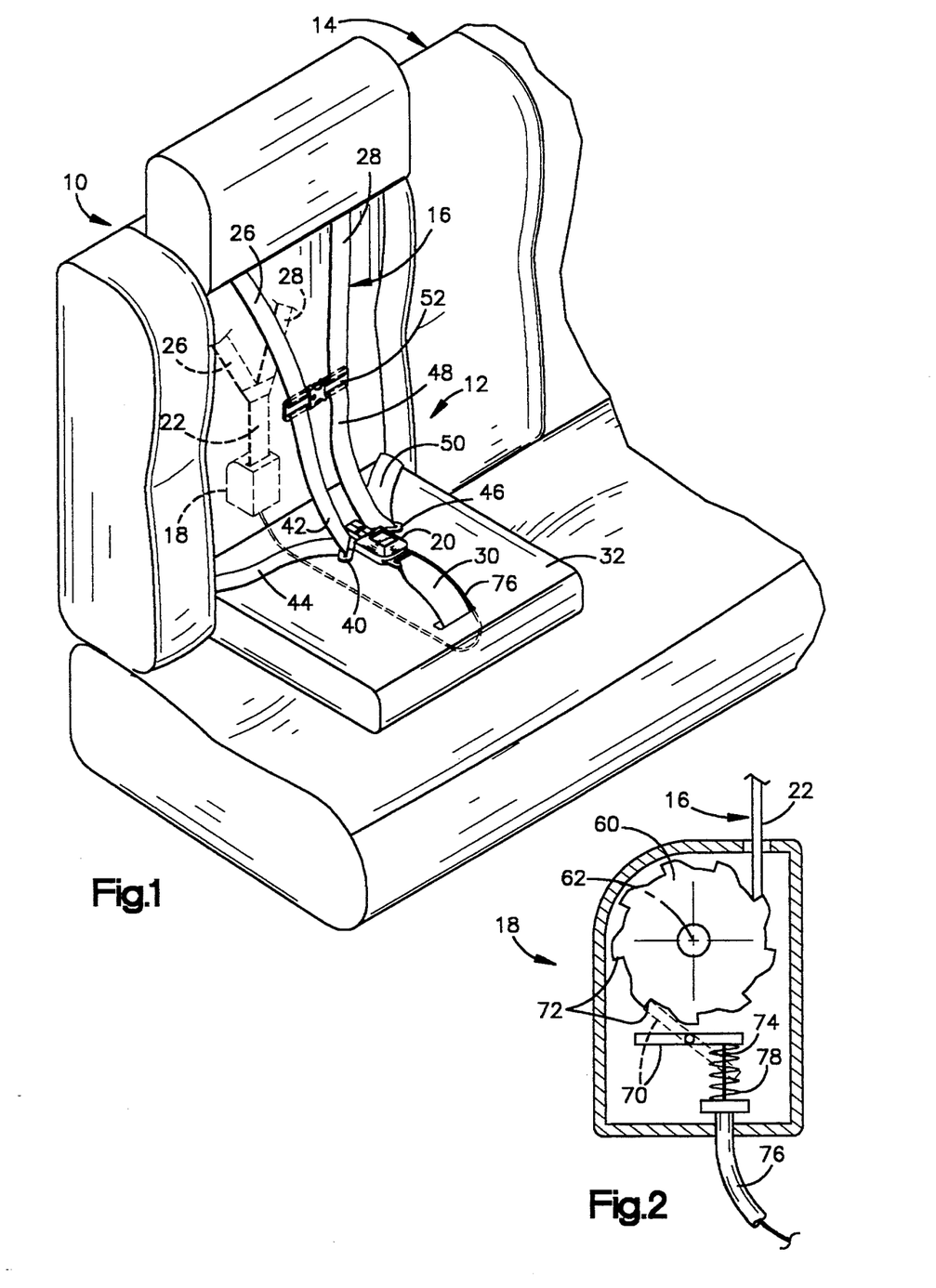
FIG. 1 is a view of a seat belt system which is a first embodiment of the present invention.
FIG. 2 is a schematic view of parts of the seat belt system of FIG. 1.

As shown in FIG. 1, a first embodiment of the present invention is a seat belt system 10. The present invention can be used in a variety of seat belt systems. By way of example, the seat belt system 10 is a child restraint system associated with a child seat portion 12 of a vehicle seat 14. The seat belt system 10 includes seat belt webbing 16, a retractor 18 at the rear of the seat 14, and a seat belt buckle 20 at the front of the seat 14.

The seat belt webbing 16 has several distinct sections. A first section 22 of the seat belt webbing 16 extends upward from the retractor 18, as shown in dashed lines in FIG. 1. The first section 22 of the seat belt webbing 16 is connected to second and third sections 26 and 28 of the seat belt webbing 16. Each of the second and third sections 26 and 28 extends upward from the first section 22 at the rear of the seat 14, through openings (not shown) in the seat 14 to the front of the seat 14, and downward over the child seat portion 12 to locations at which they are fixed to the seat 14. A fourth section 30 of the seat belt webbing 16 anchors the buckle 20 to a child seat panel 32.

A first locking tongue 40 is connected with the second section 26 of the seat belt webbing 16. The first locking tongue 40 is slidable along the length of the second section 26, and is releasably lockable in the buckle 20. When the first locking tongue 40 is locked in the buckle 0, it defines a shoulder belt portion 42 and a lap belt portion 44 of the second section 26 of the seat belt webbing 16.

A second locking tongue 46 is similarly connected with the third section 28 of the seat belt webbing 16. When locked in the buckle 20, the second locking tongue 46 defines shoulder and lap belt portions 48 and 50 of the third section 28 of the seat belt webbing 16. An adjustment member 52 is connected with the shoulder belt portions 42 and 48 of the second and third sections 26 and 28 of the seat belt webbing 16. The adjustment member 52 adjusts and locates the shoulder belt portions 42 and 48 relative to a seated child in a known manner.

The retractor 18 is shown schematically in FIG. 2. The retractor 18 includes a spool 60 upon which the first section 22 of the seat belt webbing 16 is wound. The spool 60 is supported in the retractor 18 for rotation about a spool axis 62 in a winding direction, which is clockwise as viewed in FIG. 2, and in an unwinding direction, which is counterclockwise as viewed in FIG. 2. A rewind spring (not shown) in the retractor 18 is stressed upon rotation of the spool 60 in the unwinding direction, and biases the spool 60 to rotate back in the winding direction.

The retractor 18 further includes a lock bar 70. The lock bar 70 is supported for pivotal movement between a non-locking position, as shown in solid lines in FIG. 2, and a locking position, as shown in dashed lines in FIG. 2. When the lock bar 70 is in the locking position, it extends into the path of movement of ratchet teeth 72 on the spool 60 to block rotation of the spool 60 in the unwinding direction.

A cable 74 is connected with the lock bar 70 in the retractor 18. The cable 74 extends from the retractor 18 to the buckle 20 through a sheath 76, and is movable longitudinally in the sheath 76. The cable 74 moves the lock bar 70 from the non-locking position to the locking position against the bias of a coil spring 78 when the cable 74 moves outward of the retractor 18.

Figure 3:
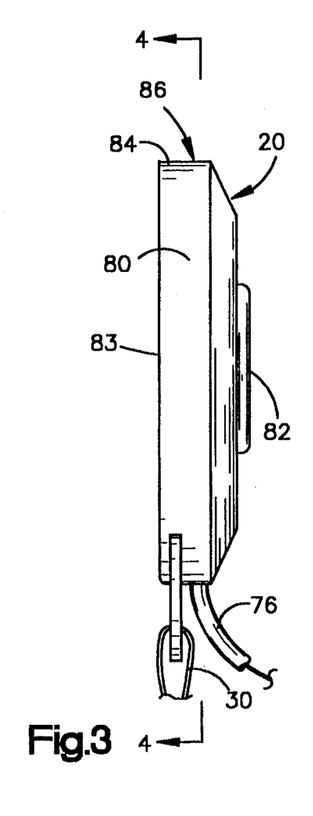
FIG. 3 is a side view of parts of the seat belt system of FIG. 1.
Figure 4:
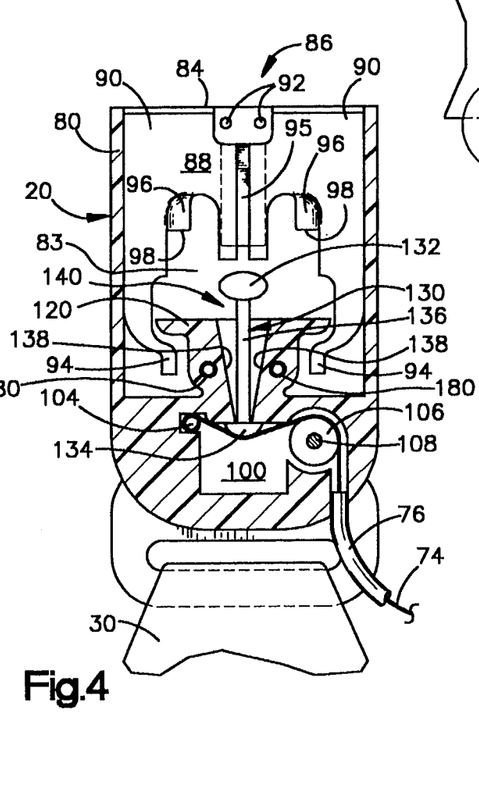
FIG. 4 is a view taken on line 4—4 of FIG. 3.

The buckle 20 is shown in greater detail in FIGS. 3 and 4. As shown in FIG. 3, the buckle 20 has a body 80 and a pushbutton 82. The body 80 has a base wall 83 and a front end surface 84 which defines an opening 86 through which the first and second locking tongues 40 and 46 are movable into the buckle 20. As shown in FIG. 4, the body 80 of the buckle 20 further defines a tongue compartment 88 which extends inward from the opening 86.

A pair of generally planar latch members 90 are supported within the tongue compartment 88 in the buckle 20. Each of the latch members 90 is connected to the body 80 of the buckle 20 by a respective pin 92 adjacent to the opening 86. Each of the latch members 90 has a free inner end portion defining an actuator arm 94 at the inner end of the tongue compartment 88. The actuator arms 94 are movable in directions perpendicular to the base wall 83 of the buckle 20 upon bending of the latch members 90 between the actuator arms 94 and the pins 92. A leaf spring 95 biases the latch members 90 away from the base wall 83. Each of the latch members 90 also has a raised locking portion 96 with an inner edge surface 98.

The body 80 of the buckle 20 further defines a cable compartment 100. The cable compartment 100 contains an anchor pin 104 and a pulley 106 which is supported for rotation about a hub 108. The cable 74, which extends from the retractor 18 to the buckle 20, extends into the cable compartment 100 in the buckle 20 as shown in FIG. 4. The cable 74 thus extends from the sheath 76 and around the pulley 106 to the anchor pin 104, at which it is fixed to the buckle 20.

The body 80 of the buckle 20 also has a central portion 120. The central portion 120 of the buckle 20 and the cable 74 support and guide an actuator member 130 for movement within the buckle 20. The actuator member 130 has a head 132, a base 134, and a shaft 136 connecting the head 32 with the base 134. The head 132 of the actuator members 130 is located in the tongue compartment 88, while the base 134 is located in the cable compartment 100. The central portion 120 of the buckle 20 has a pair of inner surfaces 138 that define a slot 140 which extends between the cable compartment 100 and the tongue compartment 88. The inner surfaces 138 are closely spaced from each other adjacent to the cable compartment 100, and diverge toward the tongue compartment 88. The central portion 120 of the buckle 20 thus blocks movement of the base 134 of the actuator member 130 into the slot 140, and permits movement of the shaft 136 from side to side in the slot 140 pivotally about the base 134. The cable 74 extends across the base 134 of the actuator member 130. The tension imparted to the cable 74 by the coil spring 78 in the retractor 18 enables the cable 74 to hold the base 134 against the central portion 120 of the buckle 20, as shown in FIG. 4, when neither of the locking tongues 40 and 46 is locked in the buckle 20.

Figure 5:
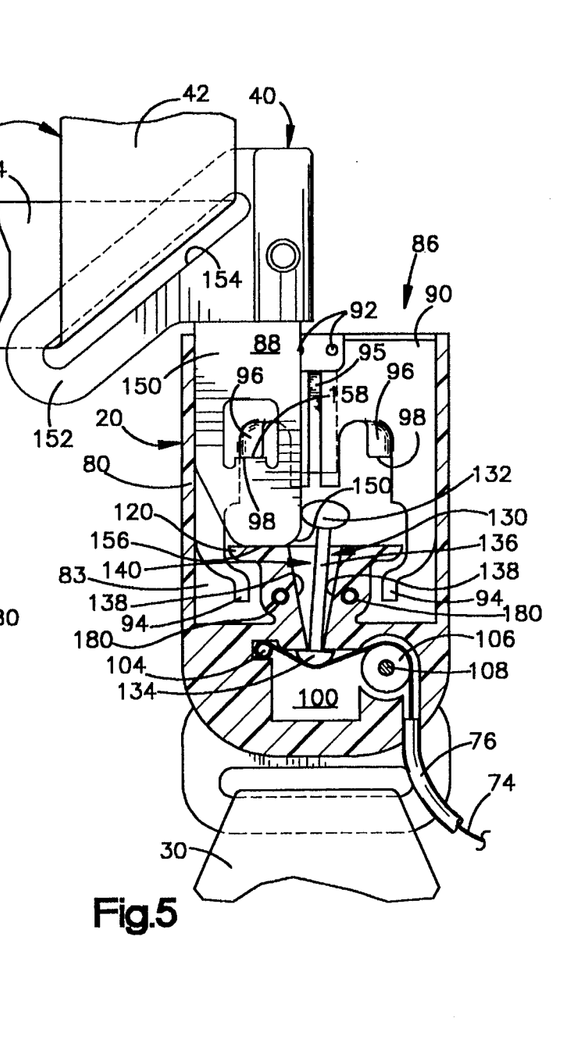
FIGS. 5, 6 and 7 are views of other parts of the seat belt system of FIG. 1 in association with the parts shown in FIG. 4.

As shown in FIG. 5, the first locking tongue 40 includes a latch plate 150 and a webbing guide 152. The webbing guide 152 has an inner edge surface 154 defining a slot through which the second section 26 of the seat belt webbing 16 (FIG. 1) extends. The latch plate 150 has a leading edge surface 156 and an inner edge surface 158 that partially defines an opening in the latch plate 150.

When the first locking tongue 40 is moved into the position shown in FIG. 5, the latch plate 150 is moved into one side of the tongue compartment 88 through the opening 86. The latch plate 150 is thus moved downwardly, as viewed in FIG. 5, over the corresponding latch member 90 in the tongue compartment 88. The latch plate 150 bends the latch member 90 behind the latch plate 150 against the bias of the leaf spring 95 as the leading edge surface 156 of the latch plate 150 slides downward over the raised locking portion 96 of the latch member 90. When the latch plate 150 reaches the position shown in FIG. 5, the latch member 90 is moved back toward its original position by the bias of the leaf spring 95. The inner edge surface 98 on the raised locking portion 96 of the latch member 90 is thus moved across the inner edge surface 158 of the latch plate 95. The inner edge surface 98 then blocks movement of the latch plate 150 outward from the tongue compartment 88. The first locking tongue 40 is thus locked in the buckle 20.

The latch plate 150 also moves against the actuator member 130 when the first locking tongue 40 is moved into the buckle 20 toward the locked position shown in FIG. 5. Specifically, a curved corner portion 160 of the leading edge surface 156 moves against the head 132 of the actuator member 130 and pushes the head 132 to the right, as viewed in the drawings. The first locking tongue 40 thus moves the actuator member 130 pivotally from the position shown in FIG. 4 to an intermediate position, as shown in FIG. 5, when the first locking tongue 40 is locked in the buckle 20. The actuator member 130 is moved pivotally by the first locking tongue 40, rather than downward into the cable compartment 100, because the tension in the cable 74 sufficiently resists downward movement of the actuator member 130. Such pivotal movement of the actuator member 130 into the intermediate position of FIG. 5 does not cause the cable 74 to move in the cable compartment 100.

Figure 6:
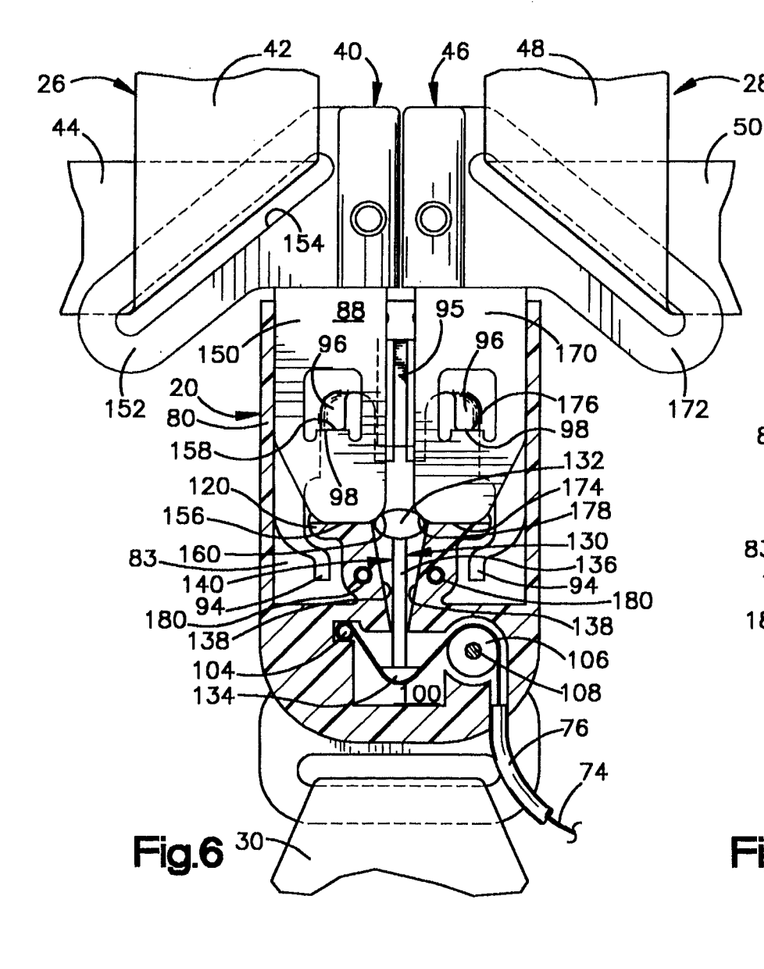

As shown in FIG. 6, the second locking tongue 46 is shaped like the first locking tongue 40. The second locking tongue 46 thus includes a latch plate 170 and a webbing guide 172. The latch plate 170 has a leading edge surface 174 and an inner edge surface 176, and is locked in the buckle 20 in the position shown in FIG. 6 in the same manner as described above with reference to the latch plate 150 and FIG. 5. Moreover, when the latch plate 170 is moved into the buckle 20 after the latch plate 150 has been locked in the buckle 20, a curved corner portion 178 of the leading edge surface 174 moves against the head 132 of the actuator member 130 and pushes the actuator member 130 downward in the slot 140. The actuator member 130 is pushed downward against the tension in the cable 74 by the latch plate 170 on the second locking tongue 46 because the latch plate 150 on the first locking tongue 40 blocks pivotal movement of the actuator member 130 to the left. The second locking tongue 46 thus moves the actuator member 130 from the intermediate position of FIG. 5 to an actuated position, as shown in FIG. 6, when the second locking tongue 46 is locked in the buckle 20 with the first locking tongue 40.

When the actuator member 130 is moved from the intermediate position to the actuated position as described above, the base 134 of the actuator member 130 is moved downward in the cable compartment 100. The base 134 of the actuator member 130 then pulls the cable 74 around the pulley 106 to increase the length of the cable 74 within the cable compartment 100, and thus pulls an additional length of the cable 74 into the buckle 20. An equal length of the cable 74 is simultaneously pulled out of the retractor 18 (FIG. 2). The lock bar 70 in the retractor 18 is thus moved into its locking position to block further unwinding of the seat belt webbing 16 from the spool 60 when the second locking tongue 46 is locked in the buckle 20 with the first locking tongue 40.

Figure 7:
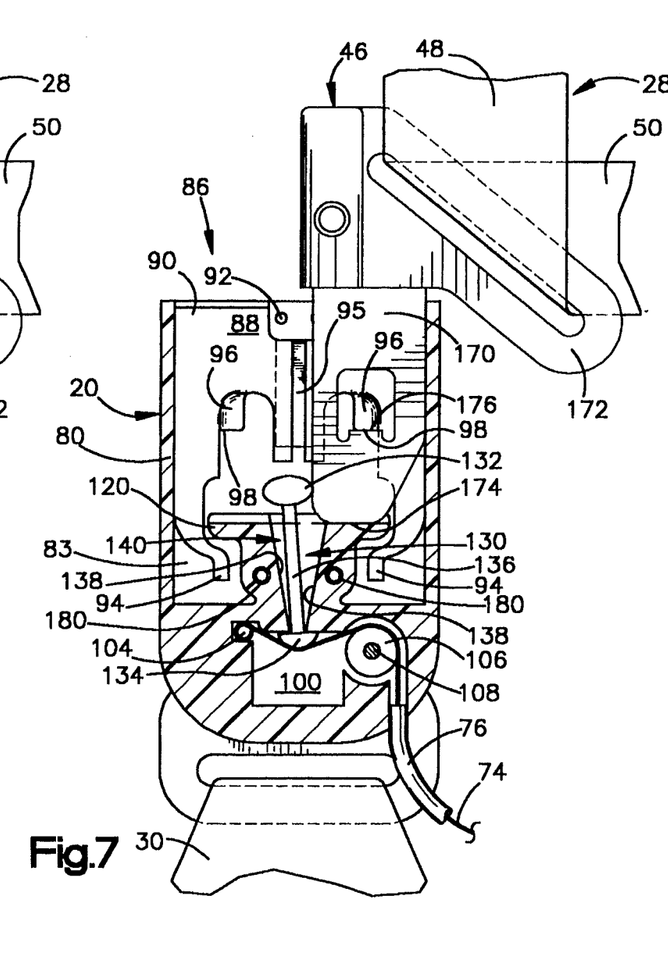
Figure 8:
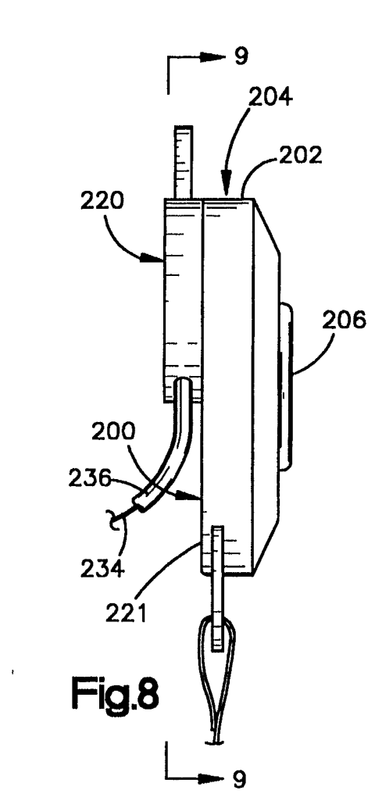
FIG. 8 is a side view of parts of a seat belt system which is a second embodiment of the present invention.

As thus far described, the actuator member 130 is moved by the first locking tongue 40 from the position of FIG. 4 to the intermediate position of FIG. 5 before being moved to the actuated position of FIG. 6 by the second locking tongue 46. However, if the second locking tongue 46 is locked in the buckle 20 before the first locking tongue 40, the second locking tongue 46 will move the actuator member 130 from the position of FIG. 4 to an alternative intermediate position, as shown in FIG. 7. The actuator member 130 is thereafter moved to the actuated position of FIG. 6 by the first locking tongue 40 when the first locking tongue 40 is subsequently locked in the buckle 20 with the second locking tongue 46. In either case, the actuator member 130 is not moved to the actuated position until both of the two locking tongues 40 and 46 are locked in the buckle 20.

When the first and second locking tongues 40 and 46 are to be released from the buckle 20, the vehicle occupant depresses the pushbutton 82 against the bias of a pair of coil springs 180. The pushbutton 82 then moves against the actuator arms 94 on the latch members 90 and bends the latch members 90 against the bias of the leaf spring 95. The inner edge surfaces 98 of the latch members 90 are then moved out of engagement with the inner edge surfaces 158 and 176 of the latch plates 150 and 170. The vehicle occupant can then move the latch plates 150 and 170 back out of the tongue compartment 88 through the opening 86. The pushbutton 82 is returned to its original position by the combined forces of the leaf spring 95 and the pair of coil springs 180. The coil spring 78 in the retractor 18 (FIG. 2) then moves the cable 74 and the actuator member 130 back into the positions shown in FIG. 4, and simultaneously moves the lock bar 70 back into the non-locking position shown in solid lines in FIG. 2.

A second embodiment of the present invention is shown in FIGS. 8–12. In the second embodiment of the invention, a seat belt buckle 200 is adapted to operate like the buckle 20 in the first embodiment of the invention described above. The buckle 200 has a front end surface 202 defining an opening 204, a pushbutton 206 at the top side of the buckle 200, and other parts for releasably locking a pair of locking tongues 210 and 212 (FIG. 11) in the buckle 200. Such other parts may be constructed as known in the art, or may alternatively be constructed as disclosed in co-pending U.S. patent application Ser. No. 941,966, entitled "Buckle Assembly," and assigned to TRW Vehicle Safety Systems Inc., or co-pending U.S. patent application Ser. No. 938,957, also entitled "Buckle Assembly," and also assigned to TRW Vehicle Safety Systems Inc.

An actuator assembly 220 constructed in accordance with the present invention is mounted on the base wall 221 of the buckle 200 in a position adjoining the front end surface 202. The actuator assembly 220 is fixed to the outer surface of the base wall 221 by any suitable means, such as by an adhesive.

Figure 9:
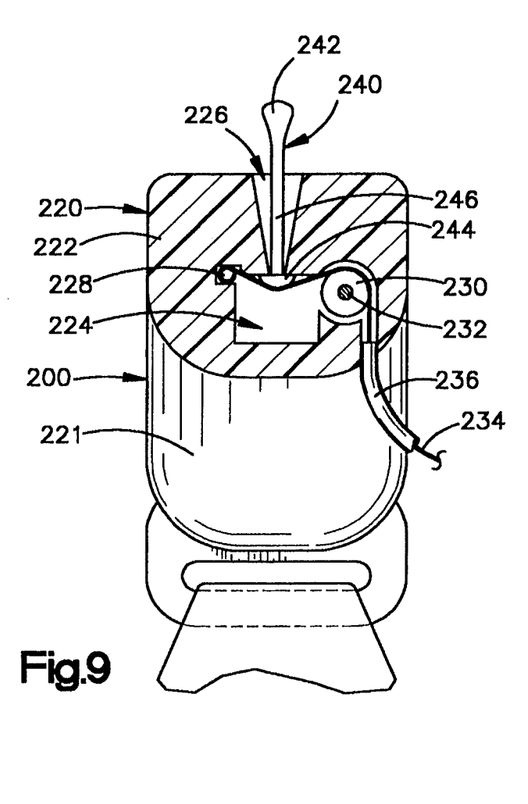
FIG. 9 is a view taken on line 9—9 of FIG. 8.

As shown in FIG. 9, the actuator assembly 220 has a body 222 defining a cable compartment 224 and a slot 226. The slot 226 extends from the cable compartment 224 to the front end of the body 222. The cable compartment 224 contains an anchor pin 228 and a pulley 230 which is supported for rotation about a hub 232. A cable 234 extends into the cable compartment 224 from a sheath 236. The cable 234 extends around the pulley 230 to the anchor pin 228, at which it is fixed to the actuator assembly 220. The opposite end of the cable 234 is connected with a lock bar in a retractor in the same manner that the cable 74 is connected with the lock bar 70 in the retractor 18, as shown in FIG. 2.

Figure 10:
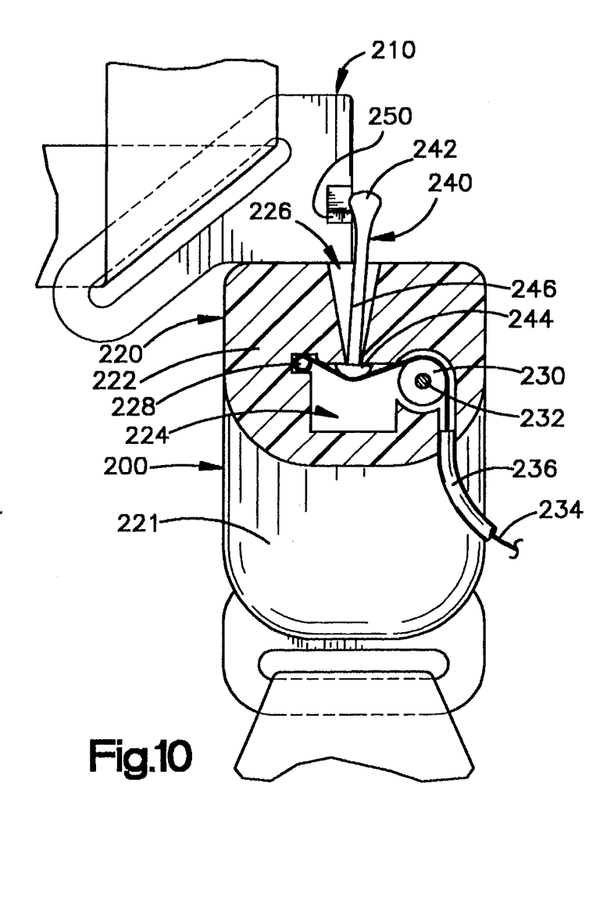
FIGS. 10, 11 and 12 are views of other parts of the seat belt system of FIG. 8 in association with the parts shown in FIG. 9.
Figure 11:
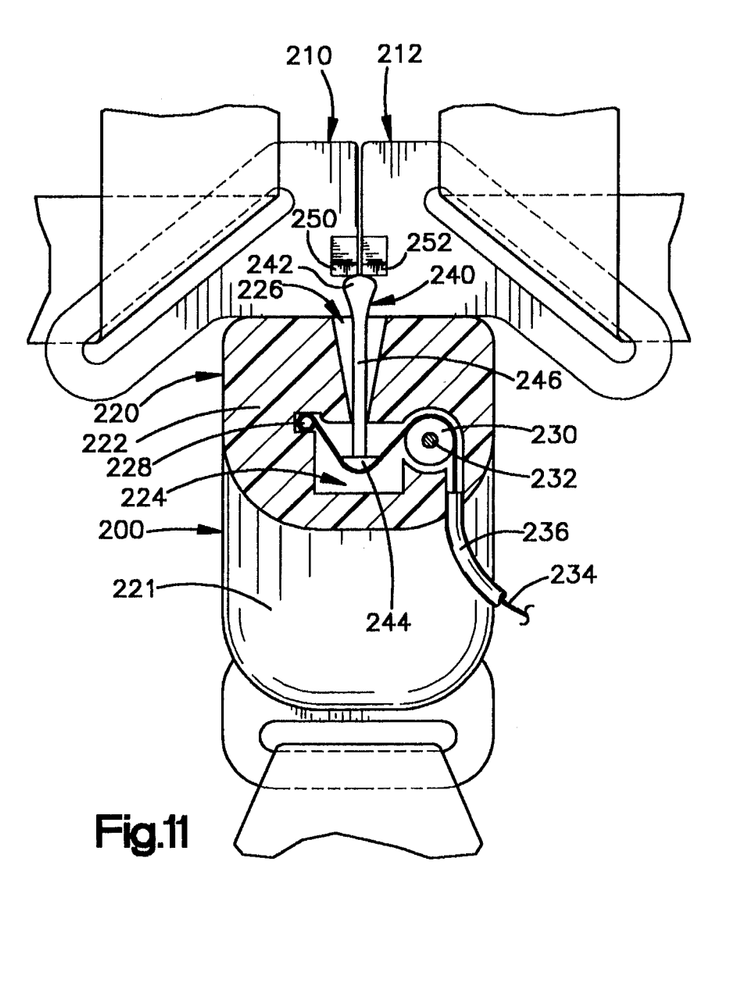

The actuator assembly 220 further includes an actuator member 240. The actuator member 240 has a head 242, a base 244, and a shaft 246 connecting the head 242 with the base 244. The actuator member 240 is supported to move in the actuator assembly 220 in substantially the same manner that the actuator member 130 moves in the buckle 20 described above. The actuator member 240 is thus supported to move in the slot 226 pivotally about the base 244 from the position shown in FIG. 9 to an intermediate position, as shown in FIG. 10. The actuator member 240 is further movable downward in the slot 226 from the intermediate position of FIG. 10 to an actuated position, as shown in FIG. 11. When the actuator member 240 moves from the intermediate position to the actuated position, the base portion 244 of the actuator member 240 moves downward in the cable compartment 224 and thus draws an additional length of the cable 234 into the cable compartment 224. An equal length of the cable 234 is simultaneously withdrawn from the associated retractor to move the lock bar in the retractor into its locking position.

As shown in FIG. 10, the first tongue 210 has a tab 250. When the first tongue 210 is moved into the buckle 220, the tab 250 moves against the head 242 of the actuator member 240 and moves the actuator member 240 pivotally from the position of FIG. 9 to the intermediate position of FIG. 10. The second tongue 212 likewise has a tab 252. When the second tongue 212 is subsequently moved into the buckle 220 with the first tongue 210 as shown in FIG. 11, the tab 252 moves against the head 242 of the actuator member 240 and moves the actuator member 240 downward from the intermediate position to the actuated position. The actuator member 240 thus causes the cable 234 to move the lock bar in the associated retractor into its locking position upon locking of both of the tongues 210 and 212 in the buckle 220.

Figure 12:
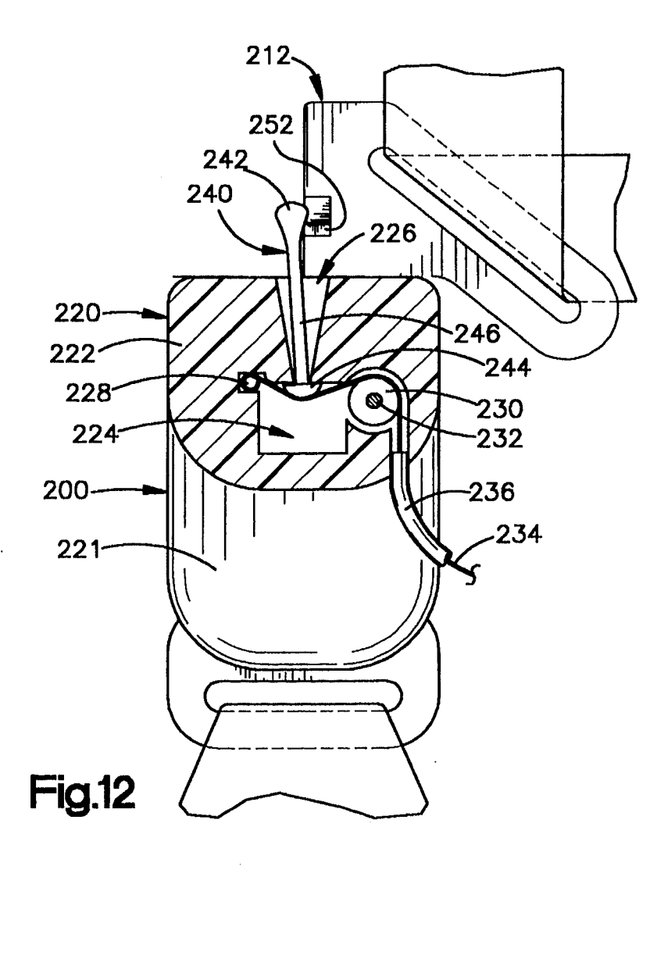

If the second tongue 212 is locked in the buckle 220 before the first tongue 210 is locked in the buckle 220, the tab 252 on the second tongue 212 will move the actuator member 240 pivotally from the position of FIG. 9 to an alternative intermediate position, as shown in FIG. 12. The tab 250 on the first tongue 210 will then move against the head 242 of the actuator member 240 to move the actuator member 240 downward from the alternative intermediate position to the actuated position when the first tongue 210 is subsequently locked in the buckle 220 with the second tongue 212. As in the first embodiment of the invention described above, the actuator member 240 is not moved to the actuated position until both of the two tongues 210 and 212 are locked in the buckle 220.

A third embodiment of the present invention is shown in FIGS. 13–17. The third embodiment of the invention is a seat belt system including a buckle 300 in which a pair of locking tongues 302 and 304 (FIG. 17) are releasably lockable. Like the buckle 200 in the second embodiment of the invention, the buckle 300 can be constructed as known in the art or as disclosed in either of the copending patent applications identified above.

An actuator assembly 310 constructed in accordance with the present invention is mounted on the buckle 300. The actuator assembly 310 actuates a retractor 312 (FIG. 14) in response to locking of the two tongues 302 and 304 in the buckle 300.

The retractor 312 includes a spool 314 upon which seat belt webbing 316 is wound. The spool 314 is supported in the retractor 312 for rotation about a spool axis 317 in a winding direction, which is clockwise as viewed in FIG. 14, and in an unwinding direction, which is counterclockwise as viewed in FIG. 14. A rewind spring (not shown) in the retractor 312 is stressed upon rotation of the spool 314 in the unwinding direction, and biases the spool 314 to rotate back in the winding direction.

Figure 15:
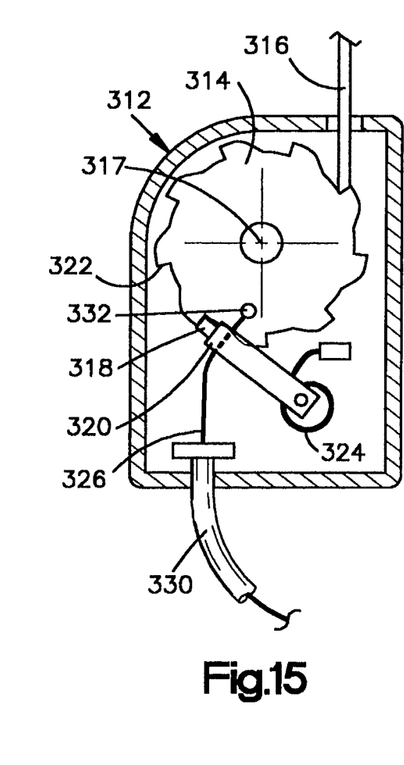
FIG. 15 is a view of the parts of FIG. 14 in different positions.

The retractor 312 further includes a lock bar 318 and a cable lever 320. The lock bar 318 is supported for pivotal movement between a non-locking position, as shown in solid lines in FIG. 14, and a locking position, as shown in FIG. 15. When the lock bar 318 is in the locking position, it extends into the path of movement of ratchet teeth 322 on the spool 314 to block rotation of the spool 314 in the unwinding direction. The cable lever 320 and the lock bar 318 are connected to each other to move pivotally together in the retractor 312. A coil spring 324 urges the cable lever 320 to move pivotally in a clockwise direction as viewed in FIG. 14, and thus urges the lock bar 318 to move pivotally toward the locking position.

A cable 326 is associated with the cable lever 320. The cable 326 extends through, and is movable longitudinally in, a passage extending transversely through the cable lever 320. The cable 326 further extends from the retractor 312 to the actuator assembly 310 at the buckle 300 through a sheath 330, and is movable longitudinally in the sheath 330. A knob 332 on the end of the cable 326 enables the cable 326 to pull the cable lever 320 pivotally in the counterclockwise direction against the bias of the coil spring 324 upon longitudinal movement of the cable 326 outward of the retractor 312. The knob 332 on the end of the cable 326 thus enables the cable 326 to move the lock bar 318 pivotally from the locking position of FIG. 15 to the unlocking position of FIG. 14 upon movement of the cable 326 outward of the retractor 312.

Figures 13, 14:
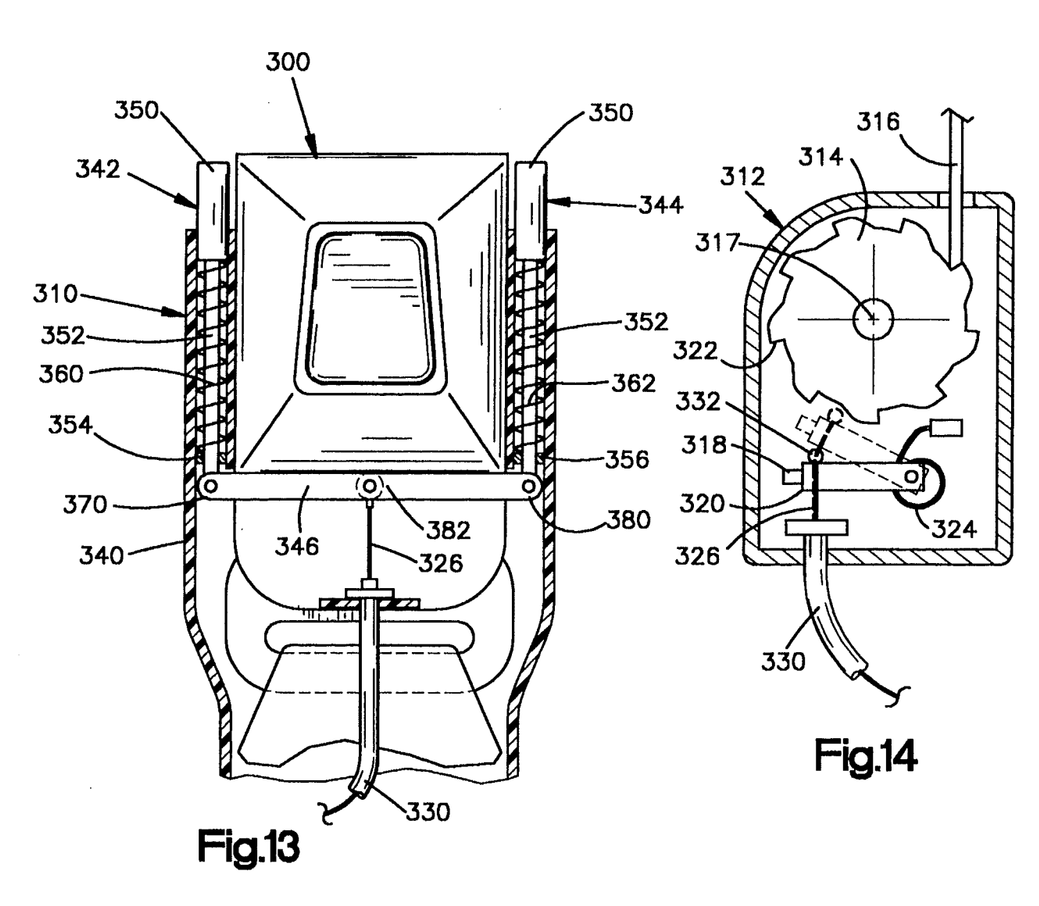
FIG. 13 is a front view of parts of a seat belt system which is a third embodiment of the present invention.
FIG. 14 is a schematic view of parts of the seat belt system of FIG. 13.

As further shown in FIG. 13, the actuator assembly 310 includes a housing 340. The housing 340 is fixed to the buckle 300 by an adhesive or by any other suitable means. The actuator assembly 310 further includes a first plunger 342, a second plunger 344, and an actuator arm 346.

Each of the two plungers 342 and 344 has a head 350 and a shaft 352. The shaft 352 of the first plunger 342 is contained within the housing 340, and extends along the left hand side of the buckle 300, as viewed in FIG. 13. The shaft 352 of the first plunger 342 further extends through a first stopper 354 which is fixed in the housing 340. The head 350 of the first plunger 342 extends outward from the housing 340 at a location adjacent to the front end of the buckle 300 on the left hand side of the buckle 300.

The shaft 352 of the second plunger 344 also is contained within the housing 340. The shaft 352 of the second plunger 344 extends along the right hand side of the buckle 300 and through a second stopper 356 which is fixed in the housing 340. The head 350 of the second plunger 344 extends outward from the housing 340 at a location adjacent to the front end of the buckle 300 at the right hand side of the buckle 300.

A first plunger spring 360 extends over the shaft 352 of the first plunger 342 between the first stopper 354 and the head 350 of the first plunger 342. A second plunger spring 362 similarly extends over the shaft 352 of the second plunger 344 between the second stopper 356 and the head 350 of the second plunger 344. The first and second plunger springs 360 and 362 respectively bias the first and second plungers 342 and 344 upward, as viewed in FIG. 13, toward the front end of the buckle 300.

The actuator arm 346 extends across the rear end of the buckle 300 and has a first end portion 370, a second end portion 380, and a middle portion 382. The first end portion 370 of the actuator arm 346 is connected with the shaft 352 of the first plunger 342 for pivotal movement relative to the first plunger 342. The second end portion 380 of the actuator arm 346 is likewise connected with the shaft 352 of the second plunger 344 for pivotal movement relative to the second plunger 344. The middle portion 382 of the actuator arm 346 is connected with the cable 326 which, as described above, extends through the sheath 330 between the actuator assembly 310 and the retractor 312. The middle portion 382 of the actuator arm 346 is connected with the cable 326 to move with the cable 326 upon longitudinal movement of the cable 326 inward or outward of the actuator assembly 310, and simultaneously to move pivotally relative to cable 326 upon such longitudinal movement of the cable 326.

When neither of the locking tongues 302 and 304 is locked in the buckle 300, the first and second plunger springs 360 and 362 hold the first and second plungers 342 and 344 in the positions shown in FIG. 13. The first and second plungers 342 and 344 then hold the actuator arm 346 in an unactuated position, as shown in FIG. 13, under the influence of the plunger springs 360 and 362. When the actuator arm 346 is in the unactuated position, a maximum length of the cable 326 is located inward of the actuator assembly 310, and a maximum length of the cable 326 is thus located outward of the retractor 312. The cable 326 then holds the lock bar 318 in the unlocking position of FIG. 14 against the bias of the coil spring 324 in the retractor 312.

Figure 16:
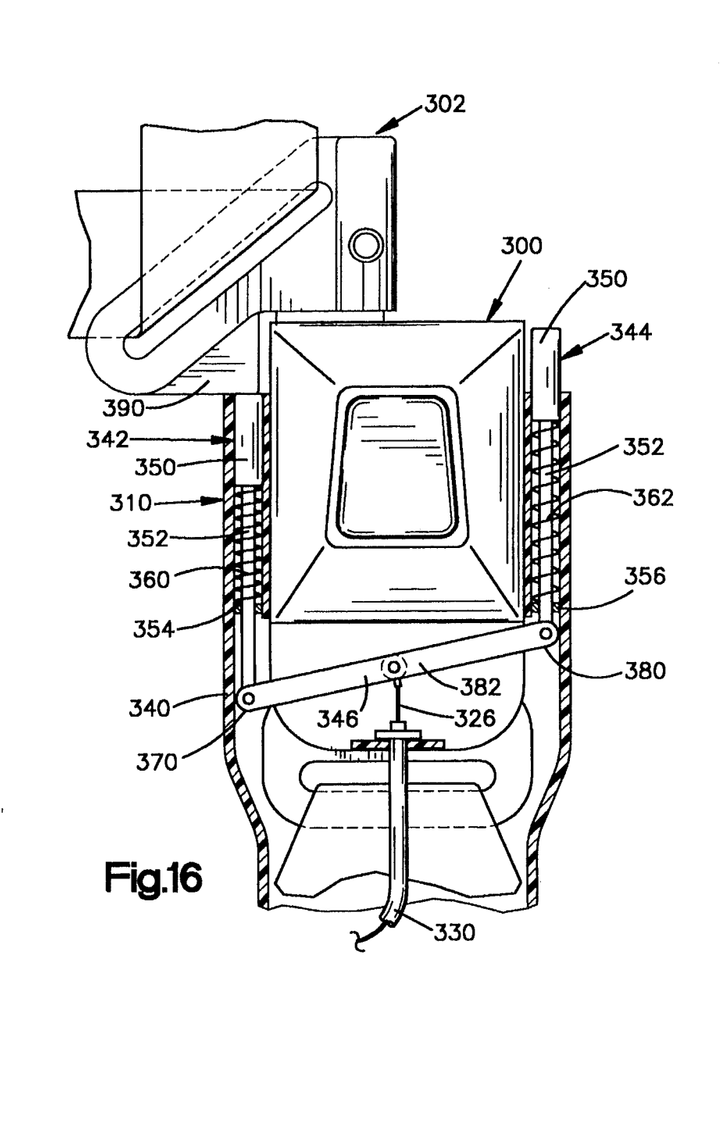
FIGS. 16 and 17 are views of other parts of the seat belt system of FIG. 13 in association with the parts shown in FIG. 13.

As shown in FIG. 16, the first tongue 302 has a tab 390. When the first tongue 302 is moved into the buckle 300, the tab 390 moves against the head 350 of the first plunger 342 and moves the first plunger 342 downward against the bias of the first plunger spring 360 from the position of FIG. 13 to the position shown in FIG. 16. The first plunger 342 then moves the actuator arm 346 pivotally from the unactuated position of FIG. 13 to an intermediate position, as shown in FIG. 16. The middle portion 382 of the actuator arm 346 is then moved downward, and thus moves a length of the cable 326 outward of the actuator assembly 310. An equal length of the cable 326 is simultaneously moved inward of the retractor 312. The length of the cable 326 that is moved inward of the retractor 312 enables the coil spring 324 to move the lock bar 318 from the unlocking position to an intermediate position, as shown in dashed lines in FIG. 14. The knob 332 on the end of the cable 326 blocks further movement of the lock bar 318 toward the locked position of FIG. 15.

Figure 17:
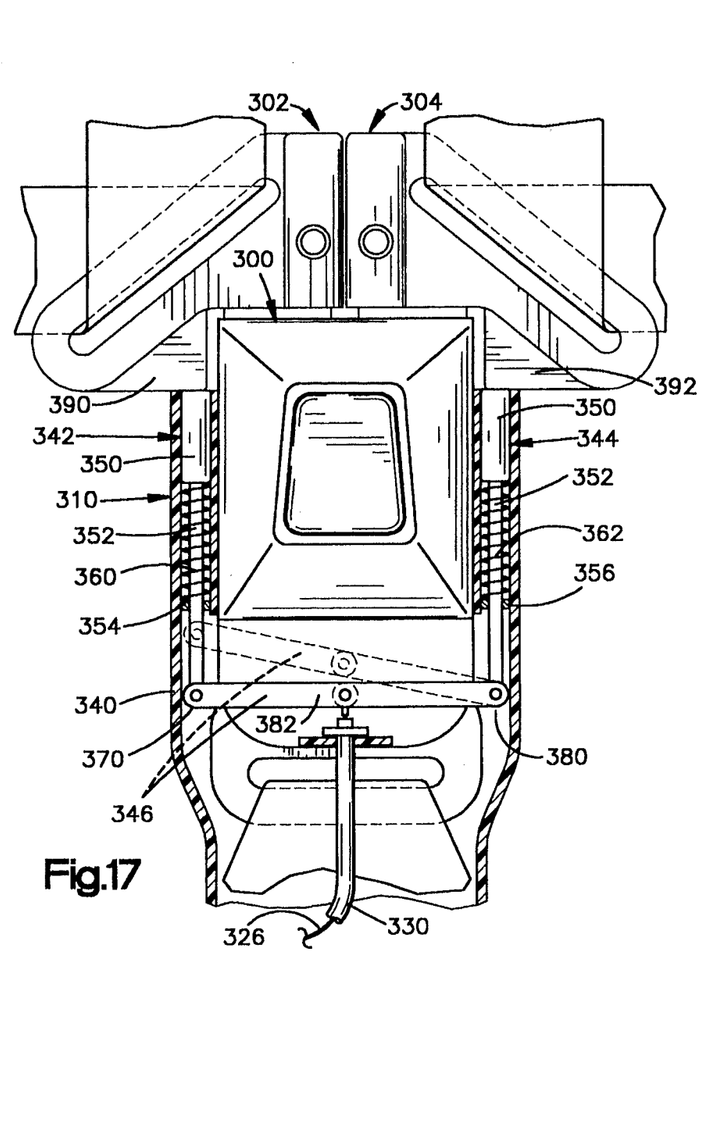

As shown in FIG. 17, the second tongue 304 also has a tab 392. When the second tongue 304 is moved into the buckle 300 beside the first tongue 302 as shown in FIG. 17, the tab 392 moves against the head 350 of the second plunger 344 and moves the second plunger 344 downward against the bias of the second plunger spring 362 from the position of FIG. 13 to the position shown in FIG. 17. The second plunger 344 then moves the actuator arm 346 pivotally from the intermediate position of FIG. 16 to an actuated position, as shown in solid lines in FIG. 17. An additional length of the cable 326 is then moved outward of the actuator assembly 310 and an additional, equal length of the cable 326 is simultaneously moved inward of the retractor 312. The additional length of the cable 326 that is moved inward of the retractor 312 enables the coil spring 324 to move the lock bar 318 from the intermediate position of FIG. 14 to the locking position of FIG. 15. The knob 332 on the end of the cable 326 is preferably moved off of the cable lever 320, as shown in FIG. 15, to ensure that a sufficient clearance is provided for the coil spring 324 to move the lock bar 318 fully into the locking position. The lock bar 318 is thus moved from the unlocking position to the locking position upon locking of both of the tongues 302 and 304 in the buckle 300°

As in the first and second embodiments of the invention described above, the tongues 302 and 304 in the third embodiment of the invention can be moved into the buckle 300 in a reversed order. The second tongue 304 would then move the actuator arm 346 from the unactuated position to an alternative intermediate position before the first tongue 302 moves the actuator arm 346 into the actuated position. The alternative intermediate position of the actuator arm 346 is shown in dashed lines in FIG. 17. In either case, the actuator arm 346 is not moved into the actuated position until both of the two tongues 302 and 304 are locked in the buckle 300.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
a retractor for seat belt webbing, said retractor including a spool which is rotatable in a webbing winding direction and a webbing unwinding direction, said retractor further including blocking means for blocking rotation of said spool in said webbing unwinding direction when said blocking means is actuated;
a first locking tongue connectable with one length of seat belt webbing;
a second locking tongue connectable with another length of seat belt webbing;
a buckle having locking means for locking said first and second tongues in said buckle; and
actuator means for actuating said blocking means in said retractor in response to locking of said first and second tongues in said buckle, said actuator means actuating said blocking means only in response to locking of both of said first and second tongues in said buckle.

2. Apparatus as defined in claim 1 wherein said actuator means is located outside of said buckle.

3. Apparatus as defined in claim 1 wherein said actuator means includes a movable actuator member, said actuator member being moved from a first position to an intermediate position upon locking of said first tongue in said buckle, said actuator member being moved from said intermediate position to a second position upon locking of said second tongue in said buckle, said actuator means actuating said blocking means upon movement of said actuator member into said second position.

4. Apparatus as defined in claim 2 wherein said buckle includes means for defining first and second locked positions into which said first and second tongues are respectively movable in said buckle, said actuator member being movable from said first position to said intermediate position by said first tongue upon movement of said first tongue into said first locked position, said actuator member being movable from said intermediate position to said second position by said second tongue upon movement of said second tongue into said second locked position when said first tongue is in said first locked position.

5. Apparatus as defined in claim 3 wherein said blocking means has an unactuated condition and an actuated condition, said actuator means including switching means for switching said blocking means from said unactuated condition to said actuated condition in response to movement of said actuator member into said second position, said switching means including a cable extending between said actuator member and said retractor.

6. Apparatus comprising:
a retractor for seat belt webbing, said retractor including a spool which is rotatable in a webbing winding direction and a webbing unwinding direction, said retractor further including blocking means for blocking rotation of said spool in said webbing unwinding direction when said blocking means is actuated;
a first locking tongue connectable with one length of seat belt webbing;
a second locking tongue connectable with another length of seat belt webbing;
a buckle having locking means for locking said first and second tongues in said buckle; and
actuator means for actuating said blocking means in said retractor, said actuator means including a movable actuator member having a first position, a second position, and an intermediate position, said actuator member being movable from said first position to said intermediate position by said first tongue upon locking of said first tongue in said buckle, said actuator member being further movable from said intermediate position to said second position by said second tongue upon locking of said second tongue in said buckle when said first tongue is locked in said buckle, said actuator means actuating said blocking means upon movement of said actuator member from said intermediate position to said second position.

7. Apparatus as defined in claim 6 wherein said actuator member is supported for movement between said first, intermediate, and second positions in an actuator assembly which is located outside of said buckle.

8. Apparatus as defined in claim 6 wherein said actuator member has a pair of intermediate positions, said actuator member being located in said first position before either of said tongues is locked in said buckler said actuator member being movable from said first position to one of said intermediate positions by said first tongue upon locking of said first tongue in said buckle before said second tongue is locked in said buckle, said actuator member being movable alternatively from said first position to the other of said intermediate positions by said second tongue upon locking of said second tongue in said buckle before said first tongue is locked in said buckle, said actuator means actuating said blocking means upon movement of said actuator member into said second position from either of said intermediate positions.

9. Apparatus as defined in claim 8 wherein said blocking means has an unactuated condition and an actuated condition, said actuator means further including a switching means for switching said blocking means from said unactuated condition to said actuated condition in response to movement of said actuator member into said second position, said switching means including a cable extending between said actuator member and said retractor.

10. Apparatus as defined in claim 9 wherein said switching means switches said blocking means from said unactuated condition to said actuated condition upon movement of said cable from a first cable position to a second cable position, said cable being engaged with said actuator member so as to remain in said first cable position when said actuator member moves from said first position to either of said intermediate positions, and to move from said first cable position to said second cable position when said actuator member moves from either of said intermediate positions to said second position.

11. Apparatus as defined in claim 9 wherein said switching means switches said blocking means from said unactuated condition to said actuated condition upon movement of said cable from a first cable position to a second cable position, said cable being engaged with said actuator member so as to move from said first cable position to an intermediate cable position when said actuator member moves from said first position to either of said intermediate positions, and to move from said intermediate cable position to said second cable position when said actuator member moves from either of said intermediate positions to said second position.

12. Apparatus as defined in claim 11 wherein said blocking means in said retractor includes a spring means for urging said cable to move toward said second cable.

* * * * *

UNITED STATES PATENT AND TRADEMARK OFFICE
CERTIFICATE OF CORRECTION

PATENT NO. : 5,398,997
DATED : March 21, 1995
INVENTOR(S) : Bob L. McFalls

It is certified that error appears in the above-indentified patent and that said Letters Patent is hereby corrected as shown below:

Column 11, line 42, change "buckle; to --buckle,--.

Column 12, line 45, after "cable" (second occurrence) insert --position--.

Signed and Sealed this

First Day of August, 1995

Attest:

BRUCE LEHMAN

Attesting Officer

Commissioner of Patents and Trademarks